(12) United States Patent
Shehadeh et al.

(10) Patent No.: US 8,833,937 B2
(45) Date of Patent: Sep. 16, 2014

(54) METHOD AND A SYSTEM FOR PROTECTION OF RETINA FROM LIGHT-INDUCED DAMAGE

(75) Inventors: Naim Shehadeh, Kfar-Yassif (IL); Ido Perlman, Haifa (IL)

(73) Assignee: Rappaport Family Institute for Research in the Medical Sciences, Haifa (IL)

( * ) Notice: Subject to any disclaimer, the term of this patent is extended or adjusted under 35 U.S.C. 154(b) by 0 days.

(21) Appl. No.: 12/669,813

(22) PCT Filed: Jul. 20, 2008

(86) PCT No.: PCT/IL2008/001002
§ 371 (c)(1),
(2), (4) Date: Jun. 17, 2010

(87) PCT Pub. No.: WO2009/013737
PCT Pub. Date: Jan. 29, 2009

(65) Prior Publication Data
US 2010/0277687 A1    Nov. 4, 2010

Related U.S. Application Data

(60) Provisional application No. 60/929,997, filed on Jul. 20, 2007.

(51) Int. Cl.
*G02B 7/10* (2006.01)
*G02C 7/10* (2006.01)
(52) U.S. Cl.
CPC ............... *G02C 7/101* (2013.01); *G02C 7/104* (2013.01); *G02C 2202/16* (2013.01)
USPC .................................. 351/159.6; 351/159.78

(58) Field of Classification Search
USPC ......... 351/158, 163–165, 177, 159.6–159.65, 351/159.73, 159.78, 159.79
See application file for complete search history.

(56) References Cited

U.S. PATENT DOCUMENTS

| | | | |
|---|---|---|---|
| 4,284,686 A | | 8/1981 | Wedding |
| 4,878,748 A | * | 11/1989 | Johansen et al. ................. 351/44 |
| 4,952,046 A | | 8/1990 | Stephens et al. |
| 5,408,278 A | * | 4/1995 | Christman ...................... 351/44 |
| 5,654,786 A | | 8/1997 | Bylander |
| 5,671,035 A | * | 9/1997 | Barnes ............................ 351/45 |

(Continued)

FOREIGN PATENT DOCUMENTS

| | | |
|---|---|---|
| WO | WO 03/005942 | 1/2003 |
| WO | WO 2009/013737 | 1/2009 |

OTHER PUBLICATIONS

Response Dated Jul. 8, 2011 to Communication Pursuant to Article 94(3) EPC of Mar. 9, 2011 From the European Patent Office Re. Application No. 08776634.1.

(Continued)

*Primary Examiner* — Darryl J Collins

(57) ABSTRACT

The present applications describes, inter alia, a retinal light management system that allows for removal of dangerous wavelengths of light while controlling the intensity of the remaining light that is allowed to pass to a user's eyes. In one embodiment, the system involves a pair of glasses that include filters that can be modified in the presence of light to reduce total light intensity reaching a diabetic's eyes.

28 Claims, 13 Drawing Sheets

(56) References Cited

U.S. PATENT DOCUMENTS

| | | | |
|---|---|---|---|
| 5,841,507 | A | 11/1998 | Barnes |
| 7,008,056 | B2 * | 3/2006 | Hartley et al. ............ 351/44 |
| 2002/0044112 | A1 | 4/2002 | Gross et al. |
| 2008/0218863 | A1 | 9/2008 | Artsyukhovich et al. |
| 2009/0059159 | A1 * | 3/2009 | Howell et al. ............ 351/41 |

OTHER PUBLICATIONS

Response Date Jul. 17, 2011 to Official Action of Jun. 25, 2010 From the ROSPATENT, Federal Government Institution 'Federal Institute of Industrial Property of the Federal Service for Intellectual Property, Patents and Trademarks' of the Russian Federation Re. Application No. 2010105566.

Communication Pursuant to Article 94(3) EPC Dated Mar. 9, 2011 From the European Patent Office Re. Application No. 08776634.1.

Official Action Dated Jun. 25, 2010 From the ROSPATENT, Federal Government Institution 'Federal Institute of Industrial Property of the Federal Service for Intellectual Property, Patents and Trademarks' of the Russian Federation Re. Application No. 2010105566 and Its Summary in English.

Communication Relating to the Results of the Partial International Search Dated Dec. 3, 2008 From the International Searching Authority Re.: Application No. PCT/IL2008/001002.

International Preliminary Report on Patentability Dated Oct. 28, 2009 From the International Preliminary Examining Authority Re.: Application No. PCT/IL2008/001002.

International Search Report Dated Apr. 24, 2009 From the International Searching Authority Re.: Application No. PCT/IL2008/001002.

Written Opinion Dated Apr. 24, 2009 From the International Searching Authority Re.: Application No. PCT/IL2008/001002.

Communication Pursuant to Article 94(3) EPC Dated May 23, 2012 From the European Patent Office Re. Application No. 08776634.1.

Optiplas/Essilor "Choosing the Right Filter" with English Translation.

Request for Examination Dated Oct. 29, 2012 From the ROSPATENT, Federal Government Institution 'Federal Institute of Industrial Property of the Federal Service for Intellectual Property, Patents and Trademarks' of the Russian Federation Re. Application No. 2010105566 and Its Summary in English.

Office Action Dated Jun. 23, 2013 From the Israel Patent Office Re. Application No. 203424 and Its Translation Into English.

* cited by examiner

| 0.001 lux | 1 mlx | Moonless clear night sky |
| 0.01 lux | 10 mlx | Quarter Moon |
| 0.25 lux | 250 mlx | Full Moon on a clear night |
| 1 lux | 1 lx | Moonlight at high altitudes |
| 3 lux | 3 lx | Dark limit of civil twilight under a clear sky |
| 50 lux | 50 lx | Family living room |
| 80 lux | 80 lx | Hallway |
| 400 lux | 4 hlx | A brightly lit office |
| 400 lux | 4 hlx | Sunrise or sunset on a clear day. |
| 1000 lux | 1 klx | Typical TV studio lighting |
| 32000 lux | 32 klx | Sunlight on an average day (min.) |
| 100000 lux | 100 klx | Sunlight on an average day (max.) |

Fig. 1

METHOD AND A SYSTEM FOR PROTECTION OF RETINA FROM LIGHT-INDUCED DAMAGE

RELATED APPLICATION

This application is a National Phase of PCT Patent Application No. PCT/IL2008/001002 having International filing date of Jul. 20, 2008, which claims the benefit of U.S. Provisional Patent Application No. 60/929,997 filed on Jul. 20, 2007. The contents of the above Applications are all incorporated herein by reference.

FIELD AND BACKGROUND OF THE INVENTION

The present invention, in some embodiments thereof, relates to a system and a method for controlling light intensity reaching a user's retina and, more particularly, but not exclusively, to a system and a method for filtering out blue light (and/or light of a greater wavelength) while keeping overall light intensity reaching a user's eyes below a maximum predetermined value.

Diabetes is a very widespread debilitating disease. In the US alone, over 20 million adults and children (7% of the population) have diabetes, and the rate of diagnosis of both Type 1 and Type 2 diabetes is rising. One of the many manifestations of the body's inability to properly control glucose levels in the blood is degradation of the retina, often leading to blindness. In North America, diabetes is the number one cause of blindness for people under 65 years of age. Diabetic retinopathy is a complication of diabetes mellitus (DM) that progresses slowly from an early background stage to a late and severe vision-threatening stage, Proliferative Diabetic Retinopathy (PDR).

A growing body of evidence indicates that the primary damage in diabetic retina is caused by hyperglycemia, and reflected by impairment in retinal function accompanied by apoptosis of retinal cells. High blood sugar levels can lead to free-radical formation, resulting in damaged blood vessels, including tiny blood vessels in the eye. Such damage leads to diabetic retinopathy. With diabetic retinopathy, some blood vessels in the retina are lost, while others leak blood. The result is a swollen retina that can cut off its supply of oxygen and nutrients. Eventually, the retina can grow new blood vessels to replace the damaged ones. New blood vessels are not as strong as the old ones and are more likely to break, causing bleeding in the eye.

The damage caused by diabetic retinopathy is considered irreversible. Still, there are ways to slow or prevent further damage to the retina. Vitrectomy, or retina-directed laser surgery, is used to seal leaky blood vessels associated with the retina. Additionally, proper insulin use to prevent extended periods of hyperglycemia aids in reducing production of free radicals that cause further eye damage.

In U.S. Pat. Nos. 4,878,748 and 5,617,154, Hoffman describes colored contact lenses that prevent light of wavelengths 200-500 nanometers wavelength from passing through the contact lenses, with light of 500-700 nanometers wavelength having a predetermined level of transmittance. Hoffman describes the UV-associated damage to lens, cornea and retina, as well as its implication in yellow cataracts. He additionally states that blue light is implicated in macular degeneration and retinal damage. People with "special requirements" have an added requirement for protection of UV and blue light.

In U.S. Pat. No. 5,177,509, Johansen and Diffandaffer describe sunglasses that effectively cut out light from 300 nanometer wavelength to a final upper wavelength of 450, 500, 515, 535, or 550 nanometers.

Optiplas (www.optiplas.co.il) offers glasses, with both light and dark tinting, for patients suffering from diabetic retinopathy and macular degeneration. They recommend CPF 527 and CPF 511 cutoffs for lenses for patients demonstrating either of these conditions so as to reduce UV and blue light from reaching the eye.

SUMMARY OF THE INVENTION

In an exemplary embodiment of the invention, there are provided methods and devices for management of the quantity and/or wavelength character of light reaching the eyes of a person, for example, for preventing the occurrence of retinal damage and/or further degradation thereof.

There is provided in accordance with an exemplary embodiment of the invention, eyewear configured to actively maintain light intensities reaching an eye to be below a first preset value and above a second preset value, which second value is functionally usable and above 30 Lux, over a range of illumination conditions ranging from 100 Lux to 5000 Lux.

In an exemplary embodiment of the invention, the eyewear comprises at least one electrically controlled light attenuating element, at least one sensor and at least one circuitry which controls said light attenuating element in response to a light intensity signal from said sensor.

In an exemplary embodiment of the invention, said circuitry varies said reaching intensities according to an estimating of accumulated damage.

In an exemplary embodiment of the invention, said circuitry includes an alarm.

In an exemplary embodiment of the invention, said sensor is physically separate from said eyewear.

In an exemplary embodiment of the invention, said circuitry is programmable with respect to at least one of said preset values.

In an exemplary embodiment of the invention, the eyewear comprises at least one non-linear dye which changes optical density in response to light intensity impinging thereon.

In an exemplary embodiment of the invention, the eyewear comprises at least one fixed filter which blocks light in wavelengths of shorter than 500 nm. Optionally, said blocked light is blocked to below said second preset value.

In an exemplary embodiment of the invention, the eyewear comprises at least one variable light filter which blocks light in wavelengths of greater than 550 nm.

There is provided in accordance with an exemplary embodiment of the invention, an eye damage monitor comprising:
(a) a light sensor;
(b) circuitry which accumulates light readings form said sensor and generates an indication of light-caused damage; and
(c) an output device which reacts to said indication.

In an exemplary embodiment of the invention, said output device comprises an alarm device.

In an exemplary embodiment of the invention, said output device comprises at least one optical light filter adapted to be mounted adjacent an eye.

In an exemplary embodiment of the invention, said circuitry different accumulates readings at different wavelengths.

There is provided in accordance with an exemplary embodiment of the invention, a method of preventing or reducing damage to an eye, comprising:

maintaining a light intensity reaching an eye at below a damage level for both indoor and outdoor activities, using an active optical element associated with the eye.

In an exemplary embodiment of the invention, the method comprises determining said damage level for a particular patient.

In an exemplary embodiment of the invention, the method comprises trading off damage levels and functionally useful levels in said maintaining.

In an exemplary embodiment of the invention, maintaining comprises maintaining for at least 50% of the time.

There is provided in accordance with an exemplary embodiment of the invention, a method of ocular monitoring, comprising:

tracking an intensity of light reaching an eye over prolonged periods of time.

Optionally, said tracking comprises tracking at a plurality of wavelengths.

There is provided in accordance with an exemplary embodiment of the invention, a method for preventing retinal damage in a diabetic patient and to prevent the development of cataract, including the following steps:

selecting a patient; and, providing said patient with light filters, said light filters having a maximum light intensity cutoff for light that passes through lenses of said light filters.

Optionally, said maximum light intensity cutoff is 150 lux. Optionally or alternatively, the method comprises providing filters for removal of at least 90% of light with wavelength between 300-530 nanometers.

In an exemplary embodiment of the invention, said light filters are made of photorefractive materials.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system. It will be understood that the methods of the present invention may be practiced on glasses, contact lenses, or other optically transparent surfaces.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a listing of light intensity values as a function of time of day or location;

DESCRIPTION OF SPECIFIC EMBODIMENTS OF THE INVENTION

Figure 2:
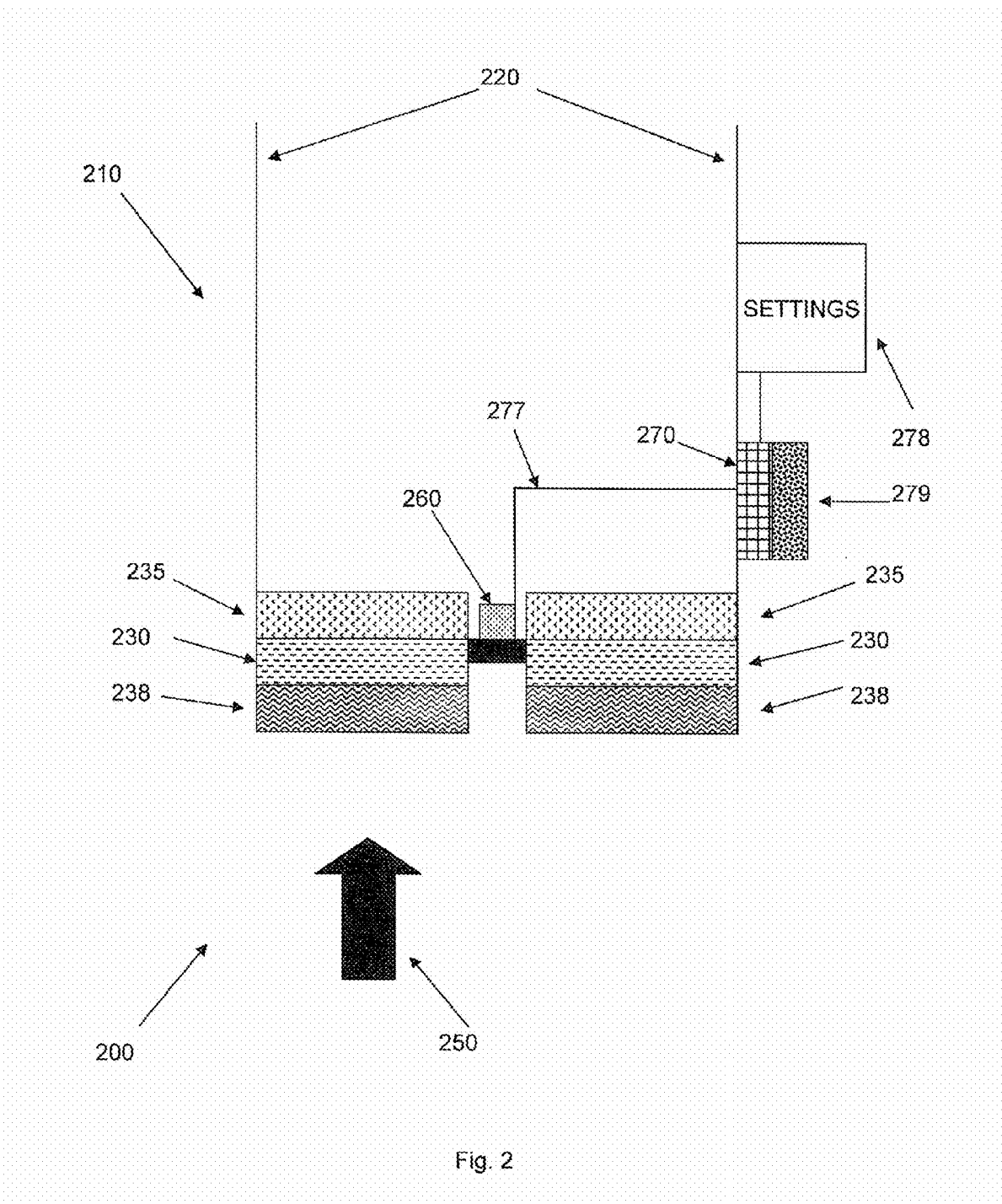
FIG. 2 is a schematic view of an exemplary embodiment of the present invention.

The present invention, in some embodiments thereof, relates to a light management system and, more particularly, but not exclusively, to glasses that control both the wavelengths and amount of light reaching a user's eye over extended periods of time.

The inventors have realized that while UV and blue light may be blocked from reaching the eyes, it may be important to monitor and/or control the total amount of light reaching the eyes and/or peak values thereof over an extended period of time. It is hypothesized that not only do UV and blue light cause damage to weakened retina associated with some disease states, but even higher wavelength light at high intensity and/or over longer periods of exposure can cause significant retinal damage. It is hypothesized that there is synergistic behavior of glycemia and high light intensity in producing free radicals that contribute to retinal degradation. While UV and blue light have been implicated in eye damage (including cataracts) in the general population, the damaging effects of high light intensity appears additionally pronounced in individuals whose retina have been compromised by diseases such as macular degradation and diabetes (without retinopathy) and/or other diseases in which self-healing mechanism of the eyes are compromised, for example, due to poor blood flow or background damage levels.

Optionally or alternatively, the damage caused by prolonged exposure to high light intensities—even of non-blue light—may be partially or fully reversed by including rest times in a regimen of light intensity control and monitoring. Specifically, individuals who are at risk for eye damage due to high light intensity may be encouraged to take periodic "rest" periods during which the intensity of light allowed to reach the eye is significantly reduced. Since retinal damage is apparently a byproduct of free-radical formation, rest periods during which the eye is not exposed to high light levels would ideally allow for free-radical management and damage repair to occur in the eye. In controlling the amount of light allowed to reach the eye—both indoors and outdoors, optionally around the clock—one should appreciate the tradeoff between minimum light required for function and maximal levels of light allowed to prevent continued retinal degradation. Optionally, the light control system works during most non-sleep hours. Controlling light only outdoors or only for part of a day would not necessarily give sufficient protection to compromised retina. In some embodiments, light levels are controlled for at least 2, 3, 4, 5, 6, 10 or intermediate numbers of hours a day. The control is optionally contiguous in time. Optionally, light levels are controlled for at least 30%, 50%, 80% or waking hours and/or for at least 60%, 70%, 80% or more of outdoor/daylight time. Optionally, such control is achieved by instructions to patients, rather than automated means as described herein. In an exemplary embodiment of the invention, monitoring and/or controlling of light levels is applied over prolonged periods of time such as several days or weeks (e.g., for sensitivity-causing medication), and months or years (e.g., for diabetic patients).

Some embodiments of the present invention allow for wavelength cutoffs from 300 nanometers to 500, 550, 600, or 650 nanometers, with controlled transmittance of wavelengths longer than these cutoff values. Cutoff wavelengths are generally filtered out by 90 or 99% as measured by incident and transmitted light intensity. Due to the specific requirements and medical issues associated with a given individual, in some embodiments of the present invention, glasses or other devices may be fitted to a user to allow for appropriate light management related to that user's needs and medical well-being.

In accordance with some embodiments of the invention it is proposed that two factors with respect to light are relevant for preventing retinal damage in diabetic subjects. The first factor is filtering of the most higher-energy light, from 300 nanometers to as high as 650 nanometers in wavelength. Optionally, higher energy light is assumed to cause more damage per photon than lower energy light, possibly varying continuously, optionally with sudden change sin effect at peaks of maximum absorption by eye pigments. The second factor concerns the total amount of light from remaining wavelengths in the visual spectrum reaching the eye at any moment and over a given period of time. By keeping light intensity reaching the eyes beneath a predetermined threshold (optionally wavelength dependent, optionally approximated by a single value for all wavelengths or small number of threshold values for several wavelengths), one significantly reduces the likelihood of formation of light-induced free radicals. Additionally, by including "rest" periods during which very low light intensity is allowed to reach the eye, one may allow for recovery from free radical formation and/or damage. For rats used in the study described below, light intensity of 40 lux or less was found—in conjunction with a minimal 75% reduction of light from 300-530 nanometers—to significantly preserve retina health. This value of 40 lux is exemplary and is not meant to limit the cutoff value of light allowed to reach the eye, as such cutoff values may well be user-specific as well as light conditions dependent. It has thus been shown that a combination of filtering of UV and blue light (and/or longer wavelength light) with control of remaining light allowed to reach the eye results in significant health benefits that are greater than the mere filtering of low wavelength light alone.

In order to achieve appropriate light control, some embodiments of the present invention have three components (which may be integrated): UV/blue light filters for removing 90-99% of UV and blue (or longer wavelength) light (approximately 300-530 nanometers in wavelength); light modulation filters for controlling how much of remaining light spectrum is allowed to pass to the eye; and, a light intensity meter/controller element that controls filters to keep the maximum light reaching the eye at or below a predetermined value. In some embodiments, monitoring rather than or in addition to control, is practiced. In an exemplary embodiment of the invention, glasses-associated filters or dyes, either working alone, or in combination with light sensors and control elements, continuously keep the transmitted light reaching the eye within a predetermined range of values. Such control of light reaching the eye may be applied both indoors and outdoors, as light available from atmospheric and environmental sources will possibly be of an intensity higher than that allowed for someone with a medically-compromised retina. Rest periods may be an active part of some embodiments of the present invention, so as to allow the eye to recover from exposure to a predetermined amount of light over a predetermined period of time. Some embodiments of the present invention may be realized as glasses, said glasses including filters that may include dyes or may be controlled by light sensor/controller elements. Glasses according to these embodiments control light reaching the eye so as to keep total light reaching the eye within a predetermined range of values, if not a specific predetermined value.

In other embodiments, the light wavelengths blocked are different, for example, reaching up to only 450, 470, 480, 500 or 515 or being greater, for example, up to 550, 570 or 600.

Within the scope of some embodiments of the invention is a method of preventing damage (e.g., damage to retina or cataracts) from occurring or increasing, by blocking light also of higher than blue wavelengths and/or blocking total light intensity. In some cases, such blocking is achieved by prescribing suitable filtering sunglasses to patients in need thereof, for example, patients with diabetes. Optionally, such prescribing includes instructions for indoor use. Optionally, the glasses are provided as a plurality of pairs of glasses and/or clip-ons, for various situations.

It should be appreciated that while the above hypothesis are made, the various embodiments of the invention are not necessarily limited by the correctness of the hypothesis. Rather, for example, apparatus and/or methods as described herein may be used even if the hypotheses are incorrect.

For purposes of better understanding some embodiments of the present invention, as illustrated in FIGS. 2, 5-8 of the drawings, reference is first made to the construction and operation of a pair of light managing glasses as illustrated in FIG. 2.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 2 illustrates a schematic view of an embodiment of the present invention that includes glasses with light filters. A retinal light control system (200) includes glasses (210), associated light modulation filters (235), UV/blue light filters (238) which may be combined with light modulation filters and an optional light intensity sensor (260). Glasses may additional include optional ear rests (220), optional optical lenses (230). It will be understood that optional lenses (230) may assume any shape and may additionally include "wrap around" side protection from side-impending incoming light (250). Glasses (210) may be made of any material and may be include prescription or non-prescription lenses (230). Filters associated with lenses (230) may be dyes, liquid-crystal based filters or other appropriate structures that allow for modulation of light intensity passing through said light modulation filters (235). Light modulation filters (235) may be integral to lenses (230) or may be physically distinct from lenses (230) placed on either or both sides of lenses (230). The elements shown in FIG. 2 are shown for convenience and may be in different physical arrangements (e.g., order from front to back may be varied) or combined into single elements.

A retinal light control system (200) may optionally include a light intensity sensor (260) that measures incoming light (250) intensity. Light intensity sensor (260) may measure incoming light and/or light that has passed through UV/blue light filters (238) and light modulation filters (235) on it way to the eyes. Light intensity sensor (260) may additionally or alternatively measure the light actually reaching the pupil of a user's eyes. Optionally, sensor (260) includes a sensor (e.g., camera) for measuring the size of the pupil and thereafter estimating the amount of light reaching the macular or other regions of the retina. The light intensity sensor (260) may measure all visible wavelengths or a portion thereof. Optionally, sensor (260) measures light intensity at a plurality of, for example, 2, 3, 4, 5 or more wavelengths, for example, including a plurality of light sensors, each with a narrow-band filter. Optionally, the amount of light reaching the cornea and/or retina are estimated, for example, based on pre-examination and/o on optical properties of an optical correction used by the patient. Optionally or alternatively, the actual amount is measured, for example, one and used for calibration, or continuously, for example, using a sensor.

In an exemplary embodiment of the invention, a light intensity sensor (260) may control light filters (235) to reduce light intensity passing through said light modulation filters (235) to a predetermined level. In an exemplary embodiment of the invention, the filters (235) includes an LCD-type shutter (e.g., two polarizers with polarization changing liquid crystal between them) whose optical density is a function of voltage applied thereto. The control system (200) includes, for example, a power source such as a battery and circuitry, for example a controller, which sets the voltage according to light intensity levels and/or thresholds and/or other light targets.

Light intensity sensor (260) may be located, for example, on outside or inside of glasses (210) and is generally located to allow for proper determination of light intensity either reaching light modulation filters (235) of glasses (210) and/or light intensity passing through light modulation filters (235) of glasses. As shown in FIG. 2, the light intensity filter (260) is shown on the inside of glasses (210) for convenience only but may be located elsewhere on glasses or alternatively separate from glasses (not shown), for example as an earring or necklace or wristband, and optionally with a wireless link to a receiver in the glasses. The above controller may be associated with the sensors or with the glasses. As shown schematically in FIG. 2, light intensity sensor (260) is placed between lenses (230) so as to measure the intensity of incoming light (250) passing through light modulation filters (235) and optional lenses (230).

Light intensity sensor (260) may measure one or multiple wavelengths. Additionally a light intensity sensor (260) may be realized as a plurality of light intensity sensors located in a single or in multiple positions. Light intensity sensor (260) if located on the outside of glasses (210) measures incident light (250) and modifies light modulation filters (235) so as to modulate the amount of light intensity that passes through said light modulation filters (235). Alternatively, and as shown in FIG. 2, if light intensity sensor (260) is located on the inside of glasses (210), namely on the side facing the user's eyes (255), then the light intensity sensor (260) can control light modulation filters (235) so as to reduce or increase light allowed to pass through light modulation filters (235) in the direction of user's eyes.

A potential advantage of some embodiments of the present invention over prior art "sunglasses" and the like is the ability to control the light intensity passing through lenses and reaching a user's retina. As such, light intensity monitor (260) may additionally include features that modulate light filters and/or dyes associated with lenses (230). Said modulation allows for appropriate reduction of light intensity from that associated with incoming light (250) to a predetermined value selected for a user's specific health requirements. Alternatively, the some embodiments of the present invention may have a separate controller element (see FIGS. 5, 6, 8 and associated embodiments) that uses data from light intensity sensor (260) to modulate light allowed to pass through optional lenses (230) and reach user retina. Lenses (230) or associated UV/blue light filters (238) will filter out more than 90% of light of wavelengths 300-530 nm. Batteries and electronic circuits (described below) may be included for proper function of the retinal light control system.

A light intensity sensor (260) alone or in combination with a separate controller element can measure light intensity or an integral of light intensity over a period of time. Additionally, a light intensity sensor (260) may measure light intensity associated with individual wavelengths of light with wavelengths of 300-700 nanometers. A light intensity sensor (260) may be programmable to allow for fixing or modification of light allowed to pass through light modulation filters (235) at a given moment or over a predetermined period of time. A light intensity sensor (260) may be programmable directly or through the agency of a computer or other appropriate electronic device. A light intensity sensor (260) may include a programmable/recordable memory element for storing light intensity data for analysis by a medical professional, and it may additionally include alarm programs or safety features to alert a user of potential problems with glasses (210) or overlimit (either time or quantity) exposure of eyes to light. In an exemplary embodiment of the invention, the system includes a wireless link (e.g., WiFi, infrared or Bluetooth) and a memory, for example a table, where settings, such as thresholds and/or target light functions are stored. Optionally, a USB connector is provided for data transfer and/or recharging of the system. In the Example shown in FIG. 2, a controller 270 is provided, for example, a microcontroller. A connector 277 provides light measurements from sensor 260 to the controller which then (optionally) controls the light filters. A batter 279 is optionally provided, optionally rechargeable and/or manually replaceable and/or powered by photovoltaic cells (not shown). Optionally, a memory 278 for storing various settings, for example, a table of thresholds and times for rest, is provided.

Light modulation filters (235) may be, for example, electronic, chemical or mechanical in nature. Light filters reduce the amount of incident light (250) that is allowed to reach the eyes (255) of a user of an embodiment of the present invention. Light modulation filters (235) may be realized as liquid crystal elements that can be electronically modified to reduce or increase the amount of light allowed to pass through glasses (210) to user's eyes (255). Alternatively, light modulation filters (235) may be realized as chemical dyes that change optical transmittance in an inverse relationship to the light intensity reaching the light modulation filters (235). Light modulation filters (235) may alternatively include mechanical elements that physically reduce or increase the amount of light allowed to pass though glasses (210) in response to light intensity measurements made by a light intensity sensor (260), for example, shutters. UV/blue light filters (238) and light modulation elements (235) are shown as separate elements for convenience only; they may be combined and potentially combined with optional lenses (230) in an embodiment of the present invention.

Figure 3:
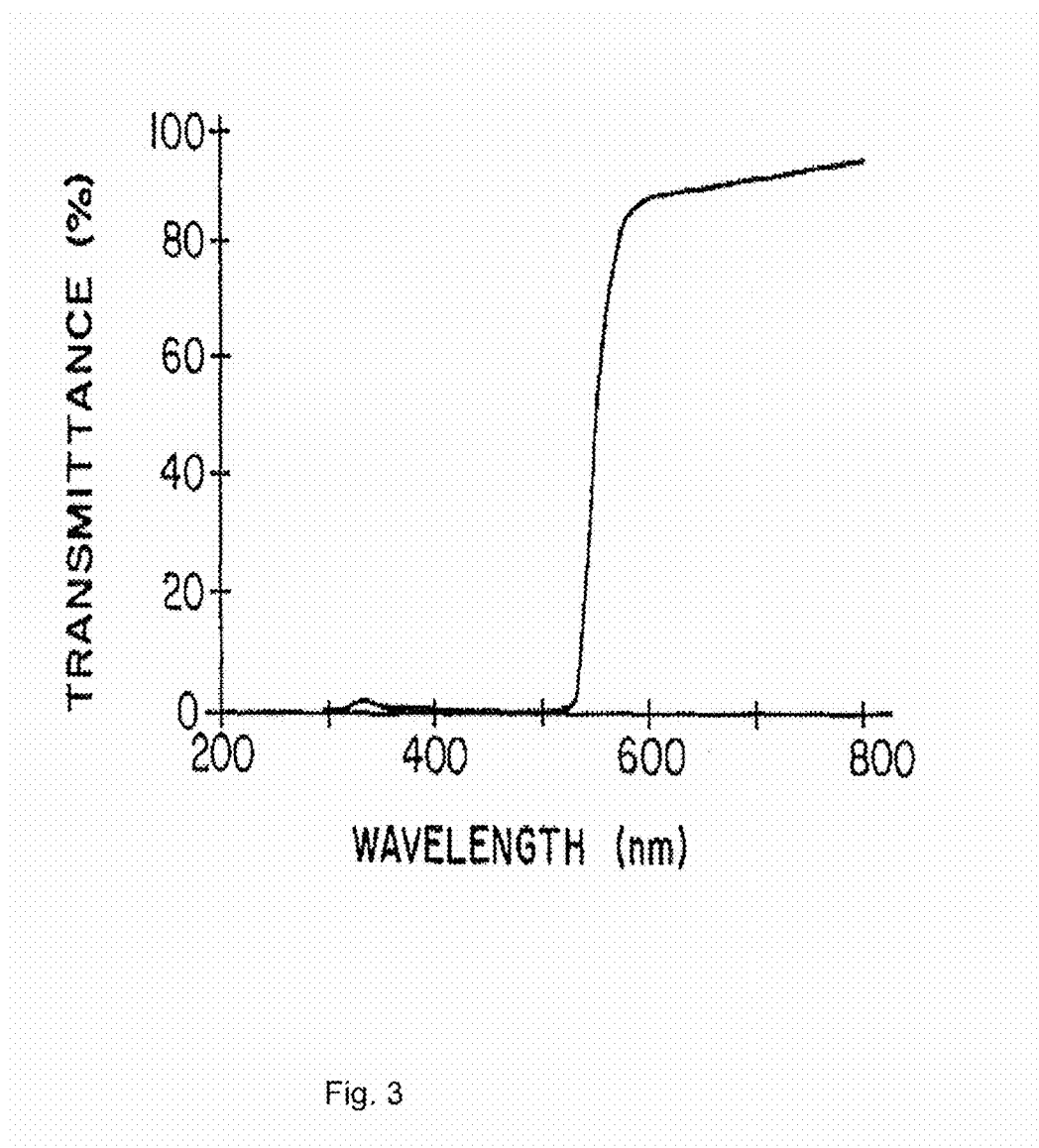
FIG. 3 is a graph of light intensity transmittance for an exemplary embodiment of the present invention.

Light modulation filters (235) may optionally include UV and blue light filters. FIG. 3 shows a typical light wavelength transmittance graph for a retinal light control system (200) according to some embodiments of the present invention. Wavelengths above 530 nanometers are tracked by a light intensity sensor (260) and may be allowed to pass through light modulation filters (235) evenly or in weighted proportion to the damage that each wavelength is considered to make on the eye. Each wavelength above those blocked out will have a weight of damage importance, and that filtering of wavelength through light modulation filters (235) may be non-linear and may be performed for all transmitted light uniformly or may be applied accordingly to each wavelength that is allowed to pass through glasses (210). In an exemplary embodiment of the invention, memory 278 includes a series of weights that indicate the relative damage for each wavelength of a plurality of wavelengths and/or desirable threshold for each wavelength. In some embodiments, all wavelengths are blocked a variable amount and not only longer wavelengths.

Figure 4:
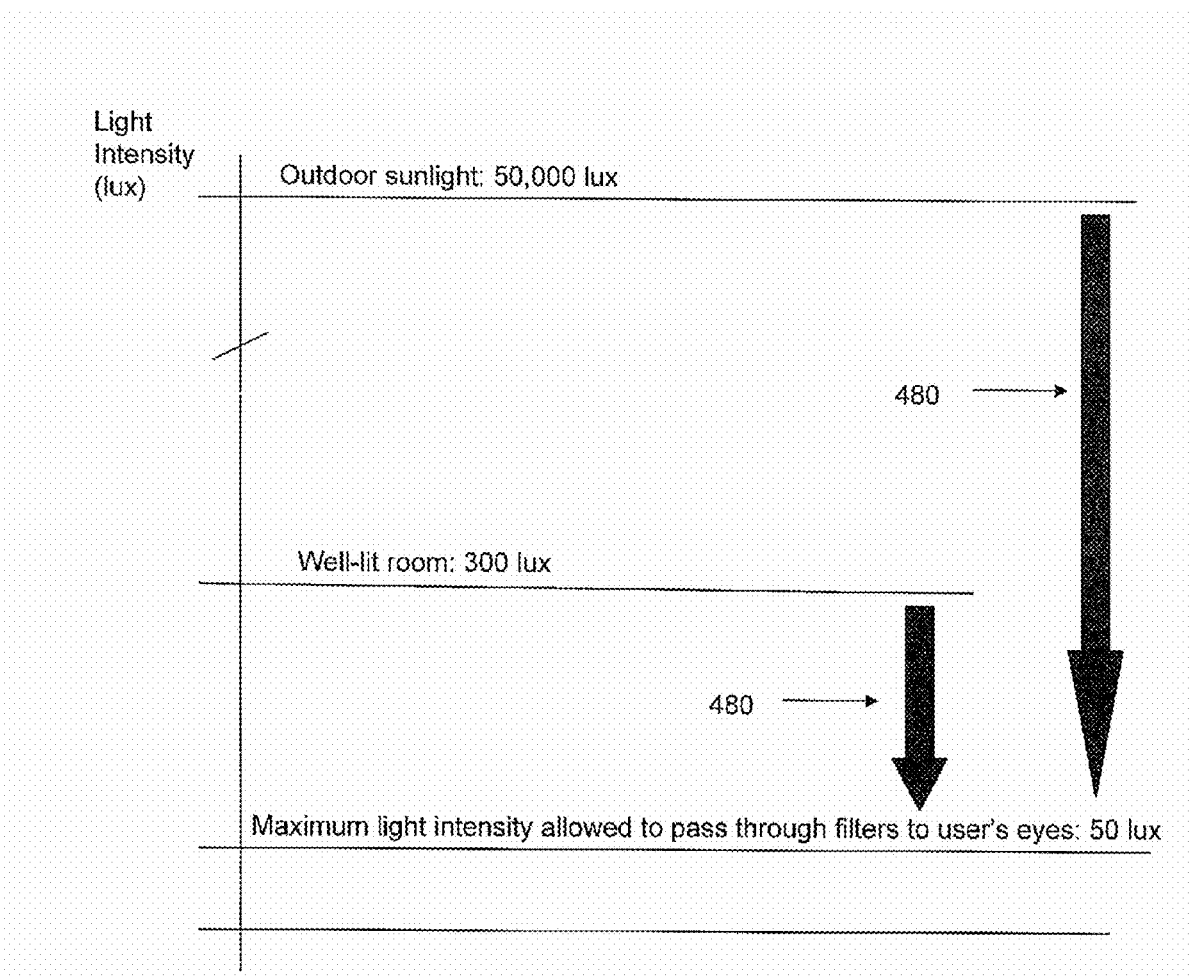
FIG. 4 is a graph showing light filtering capabilities of lens filters associated with the present invention.
Figure 5:
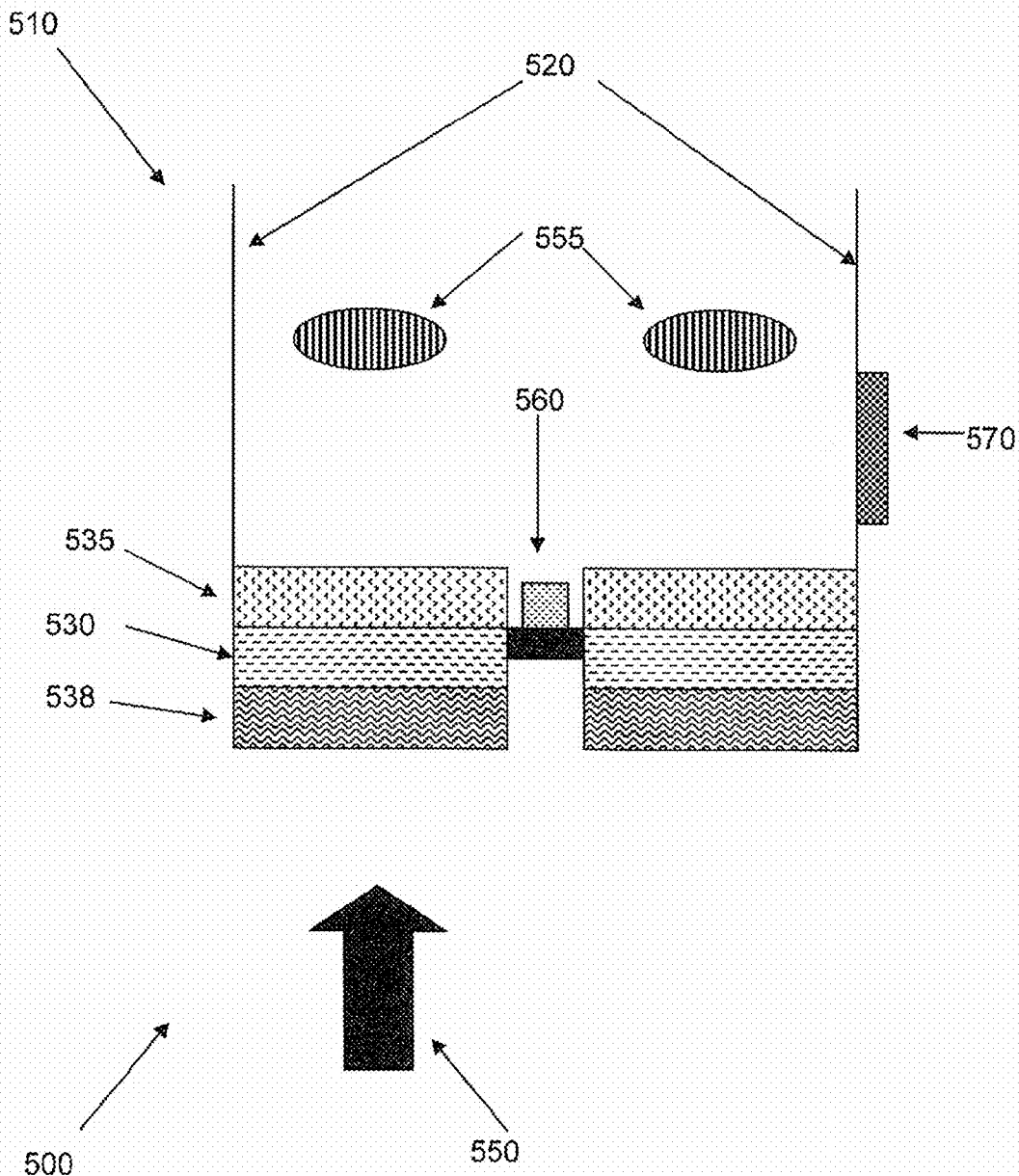
FIG. 5 is a schematic view of an exemplary embodiment of the present invention in which a controller element is associated with glasses used in light management.

FIG. 4 shows incoming light intensity from two common light sources and light intensity as it reaches the retina of a user. For this graph, the predetermined light intensity value was fixed at 50 lux. It is understood that the actual predetermined light intensity value may differ between users and/or based on exposure time and/or based on wavelength and may be determined in a preliminary examination of user's eyes and/or base don population and/or disease studies. Some embodiments of the invention allows filtering of high intensity light such as sunlight as well as lower intensity light such as that associated with a well-lit home or office. In accordance with some embodiments, it is assumed that during the day, most situations in which a diabetic user will find himself/herself will present light intensities higher than the predetermined allowable cutoff. Arrows (480) emphasize the filtering of light from surrounding environmental sources to the predetermined value of light intensity (50 lux in this example) that is allowed to reach user's eyes.

In accordance with some embodiments, it is assumed that user will wear glasses, clips, or contact lenses associated with the present invention both inside and outside for most of his/her waking hours. Outside, the retinal light control system (FIG. 2, 200) significantly reduces the light intensity from 10,000 or more lux to a predetermined value of approximately 30-150 lux (for example). Other exemplary minimum thresholds are 50 lux, 300 lux, 250 lux and 100 lux, which may be useful for some patients/diseases. Exemplary maximum thresholds are 100 lux, 150 lux, 350 lux, 500 lux and 800 lux. Indoors, the retinal light control system (200) achieves the same result, even though the environmental light intensity is orders of magnitude lower than that found outdoors. This feature of some aspects of the present invention, namely wearing "sunglasses" indoors, is unique and useful for proper eye care management, as most indoor lighted spaces provide several hundred lux of light intensity, as shown in FIG. 1.

Rat studies showed that light above 70 lux was detrimental to retina associated with diabetic rats, which suggests, in view of some embodiments of the invention, that there is a need for light filtering indoors as well as outdoors. While most "sunglasses" are used outdoors where UV light is present, some embodiments of the present invention have application both indoors and outdoors and light for preserving a damaged retina and/or preventing damage to eye. As such, it is assumed in accordance with some embodiments of the invention, that a user will wear glasses (210) or similar devices as herewith described during all daylight hours and possibly at night indoors. In an exemplary embodiment of the invention, for example, to prevent additional retina damage in diabetics and sufferers of macular degeneration, light blockage, control and/or monitoring is used in substantially all situations in which ambient light intensity is higher than a medically predetermined retinal damage threshold Attention is now turned to FIG. 5 which shows a schematic representation of an exemplary embodiment of the present invention. Retinal light control system (500) is realized as glasses (510) that include lenses (530), UV/blue light filters (538) and light modulation filters (535). Additionally, there is a light intensity sensor (560) as well as a controller element (570). The controller element (570) is integral to the glasses (510) and may be located anywhere on the glasses (510). It is shown on ear rest (520) for purposes of convenience only. The controller element (570) and the light intensity sensor (560) may be realized as a single electronic element (not shown). The controller element (570) receives information on incoming light (550) as recorded by the light intensity sensor (560). Alternatively, if the light intensity element is facing user's eyes (555), then the controller element receives information on the intensity of light that has passed through UV/blue light filters (538), optional lenses (530), and light modulation filters (535). The controller element may control light modulation filters (535) associated with optional lenses (530) so as to increase or decrease the intensity of light (of all wavelengths above 530 nanometer) passing through glasses (510) and reaching a user's eyes (550). The controller element (570) and light intensity sensor (560) may be realized as a single element and are shown as two distinct elements for convenience only. The controller element (570) may be preprogrammed with a cutoff value or a plurality of cutoff values of light intensity that may pass through glasses (510) to eyes (555) of a user. As such, the controller can control dyes or other light modulation filters (535) that are associated with glasses (510) for the purpose of constricting the amount of non-blue light that is allowed to pass through lenses (530) to reach user's eyes. UV/blue light filters (538) may optionally be under the control of controller element (570) though they may work independent of the controller element (570). The controller element (570) is generally realized as a chip, though other forms are possible.

Figure 6:
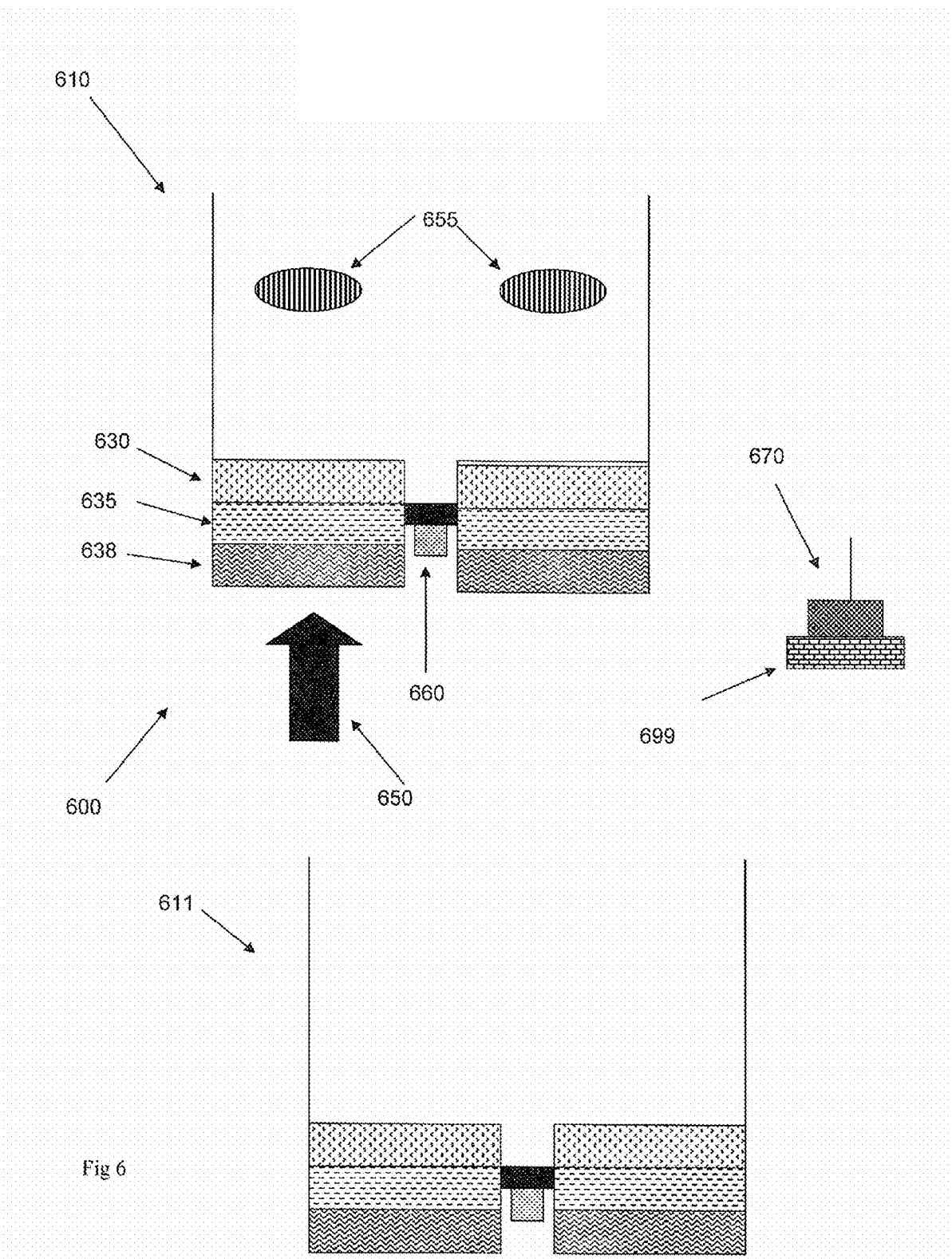
FIG. 6 is a schematic view of an exemplary embodiment of the present invention in which a controller element is physically separate from glasses used in light management.

FIG. 6 shows a schematic representation of a retinal light control system (600) that includes glasses (610) with optional lenses (630) and UV/blue light filters (638) that remove greater than 90% of light of wavelengths 300-530 nanometers from incoming light (650). In other embodiments, other percentages of such light may be removed, optionally with greater percentages for shorter wavelengths. For example, 80% of all such light is removed or 99% of UV and 83% of 520 nm wavelength light. Additionally, light modulation filters (635) associated with optional lenses (630) reduce light intensity eyes (655) of a user. Optionally, some of the reduction in light of shorter wavelength, for example, 20%, 50% or intermediate or smaller r greater numbers, are achieved by the light modulation filters (635). Intensity of incoming light (650) may be measured by a light intensity sensor (660). Alternatively, light intensity passing through UV/blue light filters (638), optional lenses (630), and light modulation filters (635) may be measured prior to said light's arrival at user's eyes (655). Data from light intensity sensor (660) is communicated to a controller element (670) that is physically separate from glasses (610). Communication between light intensity sensor (660) and controller element (670) may be over a wire or may be wireless. Wireless modes of communication include but are not limited to infrared, Wi-Fi and Bluetooth. One or more of the following potential advantages of the controller element (670) being physically separate from glasses (610) may be utilized. Firstly, a single controller element (670) may be used with different sets of glasses (610, 611) associated with a single or multiple users. Additionally, a controller element (670) in the present embodiment might be associated with an in vivo or in vitro glucose monitor (699). If user is hyperglycemic—as determined by an optinal glucose monitor (699)—then the controller element (670) associated with said glucose monitor (699) can increase the amount of filtering of light reaching user. As high blood glucose levels and high light intensities can combine in a dangerous combination to deliver large numbers of free radicals to the retina of a user's eyes (655), a controller element receiving data from a glucose monitor would be able to reduce light reaching a user at times when said user is known to be hyperglycemic. Optionally, a non-eye control element may be made larger with less discomfort to user, for example, supporting more convenient data entry. Optionally, atheistic reasons help decide the configuration.

Lens 630 are optionally prescription lens and/or may embody a light reducing dye and/or polarizer.

Rest and Monitoring

An optional additional function of a controller element (670) as described in this and in the previous embodiments may concern "rest". It has been found that giving the eye rest allows for recovery from exposure to light and the damage produced by free radicals found in the retina. A rest period may be preprogrammed into a controller element to alert a user that he/she has been exposed to a maximal quantity of light over a given period of time. A controller may optionally reduce the amount of light intensity passing through glasses (610) if a period of rest is suggested. Rest periods may involve active closing of eyes or programmed reduction of light intensity below light intensities generally allowed through glasses (610) according to the present invention.

Alternatively or additionally to controlling light, a system as described herein may be used for monitoring. For example, after determining that a user was exposed to a certain amount of light at certain wavelengths and times that could cause damage (e.g., based on a pre-stored integrative threshold or function), the user is warned to rest and/or reduce light levels. Optionally, such a warning is provided by an alarm (not shown) optionally connected to the controller. Optionally or alternatively, intermediate-automation systems are provided, for example, a semi-automatic system where a user can set light level, for example, using a knob or a switch with one or more preset light levels, and the system calculates allowed exposure times based on such settings and/or actual light reception. This may also a user to tradeoff visual quality for time.

In an exemplary embodiment of the invention, the alarm is an audio signal, for example, a buzz or recorded or generated speech. Optionally, the alarm indicates to the patient to change a light blocking setting and/or add a filter and/or change light-blocking glasses.

In an exemplary embodiment of the invention, the controller is programmed to support non-linear relationships between wavelength, time, intensity damage and/or rest periods. Optionally, such support is by approximating piecewise-linear functions or by curve-fitting functions. Optionally or alternatively, a table of situations and mapping between values and results is stored. Optionally, actual exposure is monitored and optionally reported to a physician, for example, by connecting a computer link (e.g., USB cable) to the system and reading out a stored log file. Optionally, the log is updated periodically, for example, once a minute, with respect to light intensity reaching eye (measured or estimated) at one or more wavelengths. Such a log may be compared to a progress of disease of the patient and be used to decide on changing a pharmaceutical and/or light level prescriptions.

In an exemplary embodiment of the invention, a user (or sensor) can indicated expected blood glucose levels (e.g., based on an indication of eating and an indication of patient glucose response and/or medication), so as to allow different thresholds and/or damage accumulation calculations to be carried out for times with higher blood glucose and/or insulin levels. Optionally or alternatively, such monitoring is provided for medications taken by the patient which may increase or decrease the sensitivity of the eye to damage.

Clip On

Figure 7:
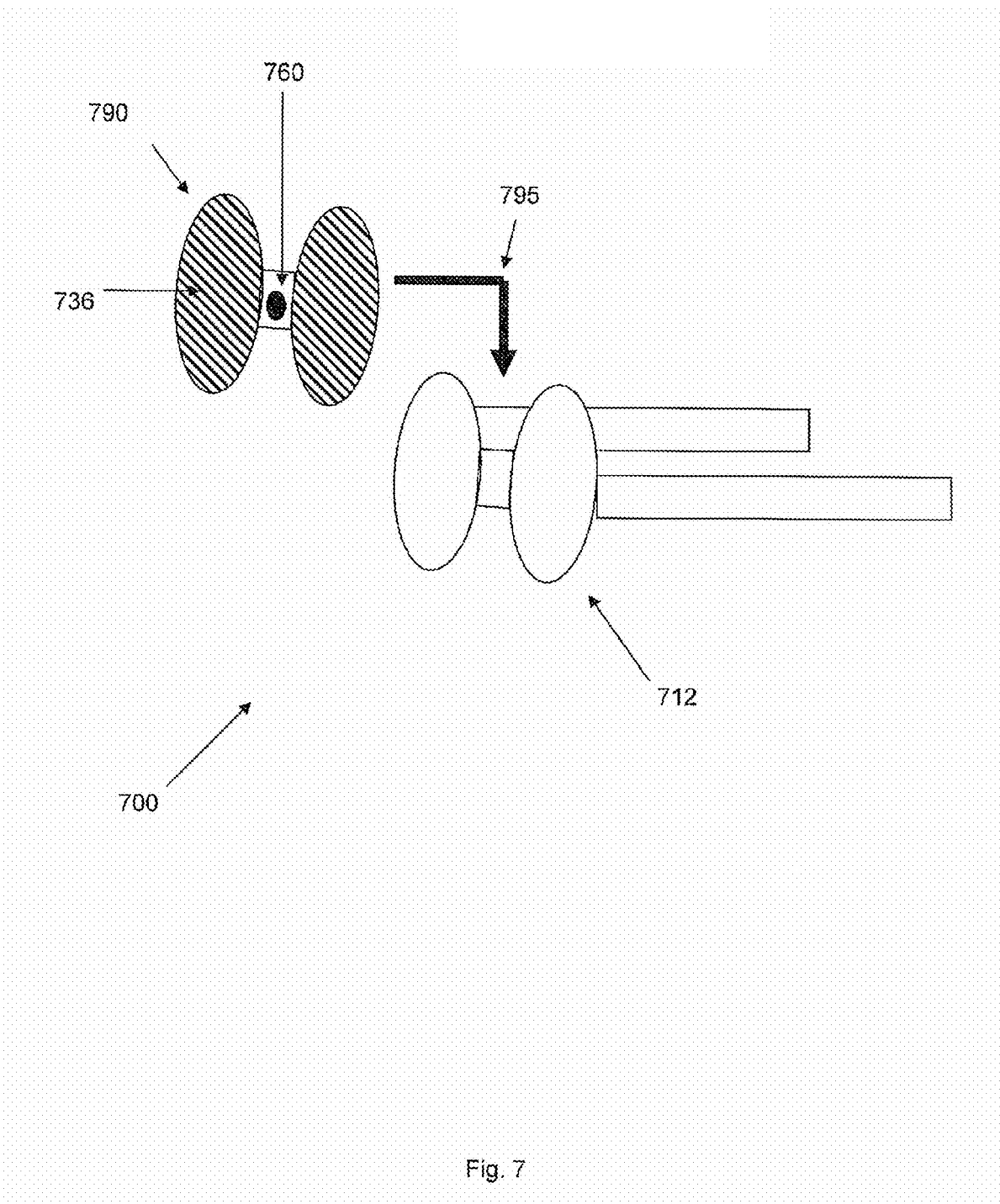
FIG. 7 is a schematic view of an exemplary embodiment of the present invention in which lenses and filters used in light management are applied in the form of a clip-on element.

Attention is now turned to FIG. 7 that shows a schematic view of an exemplary embodiment of the invention in which a clip-on (790) element is used for light modulation. Standard optical glasses (712) are optionally provided by a user. Said optical glasses (712) may be reading glasses, bifocals, or may be for nearsighted or farsighted conditions. They do not necessarily include any of the unique elements associated with the present invention, but may include light filtering, for example, as in sun-glasses. Those unique elements are provided by a clip-on (790) element. Clip-on (790) includes filters (736) that have associated UV/blue light filters and light modulation filters (not shown separately). Clip-on (790) may be attached to glasses (712) in a facile manner, as suggested by arrow (795). Clip-on (790) may include a light intensity sensor (760) as well as a controller element (not shown). Clip-on (790) may be attached to existing glasses (712) or may be designed to wrap around user's prescription glasses (712) or parts thereof. One potential advantage of the present embodiment is that it allows diabetics and others to convert existing prescription glasses immediately into a retinal light control system (700) that significantly reduces light intensity reaching sensitive retina. In an exemplary embodiment of the invention, clip-on (790) filters (736) filter out more than 90% of UV and blue light of wavelengths 300-530 nanometer, optionally using dyes known in the art. Optionally, the sensor (760) is configured to be closer to the eye than the classes, for example, being mounted on a wire and/or being configured to be on an opposite side of the lens than the filter, for example, defining a lens receiving space between the sensor and the filter.

In some embodiments, when going outdoor, a user will clip-on non-active clip-ons, for example, on active glasses as described above, for example, to reduce outdoor-light levels by 50%, 70%, 90% or more. Optionally, the glasses are configured to operate in outdoor light levels with such a clip-on.

Dye Glasses

Figure 8:
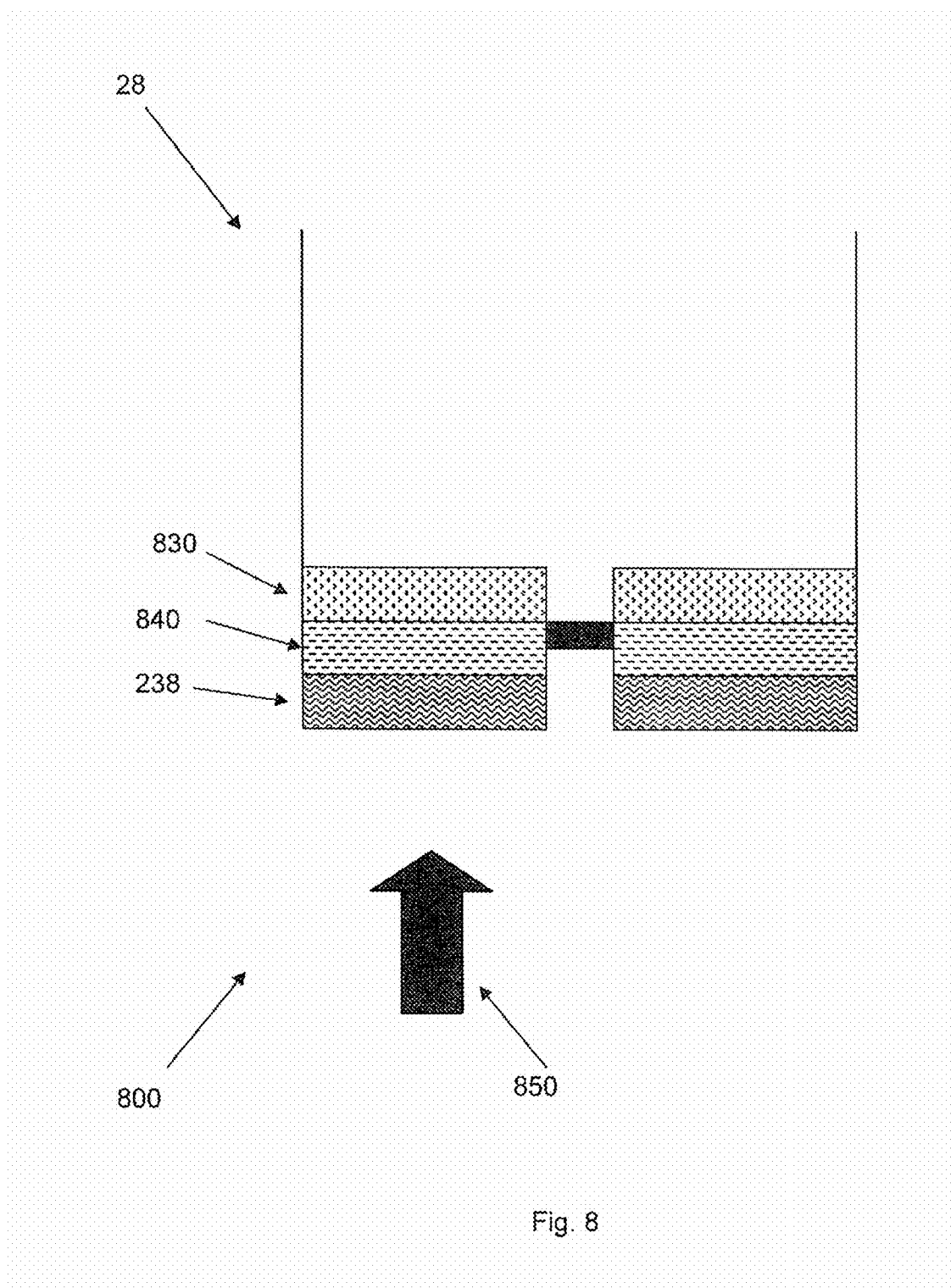
FIG. 8 is a schematic view of an exemplary embodiment of the present invention in which dyes are employed for light filtering and total light transmittance control.

FIG. 8 shows a schematic representation of an exemplary embodiment of the present invention. A retinal light control system (800) includes glasses (810) with lenses (830). Said lenses (830) include dye material (840—shown as flakes) that can both filter out light of UV and blue wavelengths as well as automatically darken to filter out incoming light (850) as per the design of said glasses (810). Dye material (840) may be realized as one or a plurality of unique dye layers. Dye material (840) may be integral to lenses (830) or may be realized as a separate element. For instance, if user is allowed 100-150 lux to pass through glasses (810), then dye material (840) is selected and formulated in construction of lenses (830) so as filter out incoming light (850) and allow 100-150 lux of light to pass through lenses (830) to user. The advantage of this embodiment includes functionality in the absence of electronics as well as simplicity of design. Exemplary appropriate dyes for filtering of UV/blue light radiation as well as modulation of incoming light intensity are described below. Optionally or alternatively, dyes of existing usage are applied in amounts and formulations that achieve the desired effects described herein. Optionally, two sets of dye are used, one to block in a fixed amount, short wavelength light and one to variably block longer wavelength light.

Tradeoff

One of the tradeoffs associated with the treatment of diabetic patients is the balance of light needed for daily function versus light that can potentially damage frail retina. If a retinal light control system does not provide enough light for routine activities such as walking outdoors or reading indoors, then a user will not use it. On the other hand, if a retinal light control system or commercial anti-UV sunglasses allow for too much light intensity to pass through to user's eyes, then the enhanced quality of life activities will be at the price of extended retina damage and potentially hastened blindness.

Figure 9:
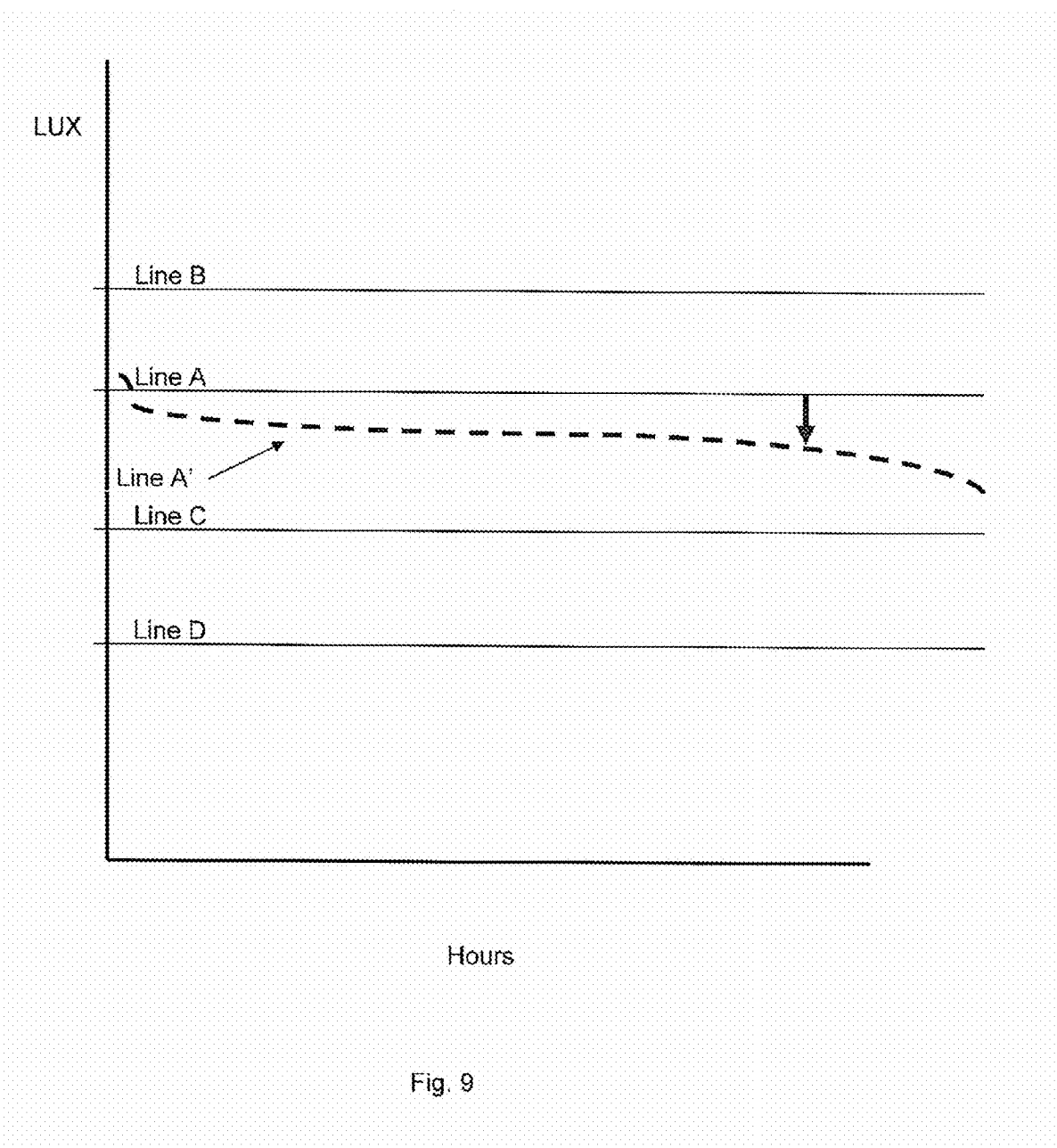
FIG. 9 is a graph showing the range of useful visible light versus the level of light that is potentially hazardous to diabetics.

FIG. 9 schematically shows several key light levels relating to vision and some embodiments of the instant invention. Specifically, line A schematically represents the level of light that is considered to be dangerous to a user if presented to an eye continuously without rest. Line B shows the level of light that is allowed a user of the present invention on the assumption that he/she will take "rest" periods as previously described (duration and light level). Line C shows the minimal light level needed for comfortable reading, while Line D shows minimum light levels associated with normal visual function in an outdoor environment, such as walking. As shown, there is a small window between "needed light" as represented by lines C & D and dangerous levels of light for diabetic patients as conveyed by lines A & B. Thus, light intensity cutoffs will be set for patients in recognition of the nature of their diabetic condition and in consideration of the light needed for normal function. It is noted that these values are not absolute and may differ for different users as well as for the same user if he/she is exposed to light for an extended period of time. For example, a user that is outdoors for several hours may have a danger threshold that is lower and thus much closer (line A' in FIG. 9) to the minimum levels of light required for reading or proper function. The present system, in some embodiments thereof, by using tables, functions and/or decision algorithms (e.g., after X time, reduce threshold to Y) can dynamically alter allowed light intensity cutoffs in response to time and intensity of light exposure that a user has experienced. Optionally, the actual cut-off level depends not only on calculated value s (which may result in a varying allowed light level) but also on actual measured values. Optionally, the system is set to allow short high light situations which are then followed by low-light situations. Optionally, a patient is warned when light levels are about to go up and/or down. Optionally or alternatively, a used can "request" additional time by operating a control, for example a knob or a remote control, optionally compensating for such a request by a longer rest period. Optionally, such a request may be denied, for example, if the user has exceeded a pre-programmed damaged threshold.

Typical cutoffs of 50-150 lux may be applied in retinal light control systems, meaning that total light allowed to pass from the environment through glasses as herewith described will be between 50-150 lux. So that these values are enforced, some embodiments of the present invention may include side-lenses/filters as well as wrap-around designs.

Exemplary Procedure

Figure 10:
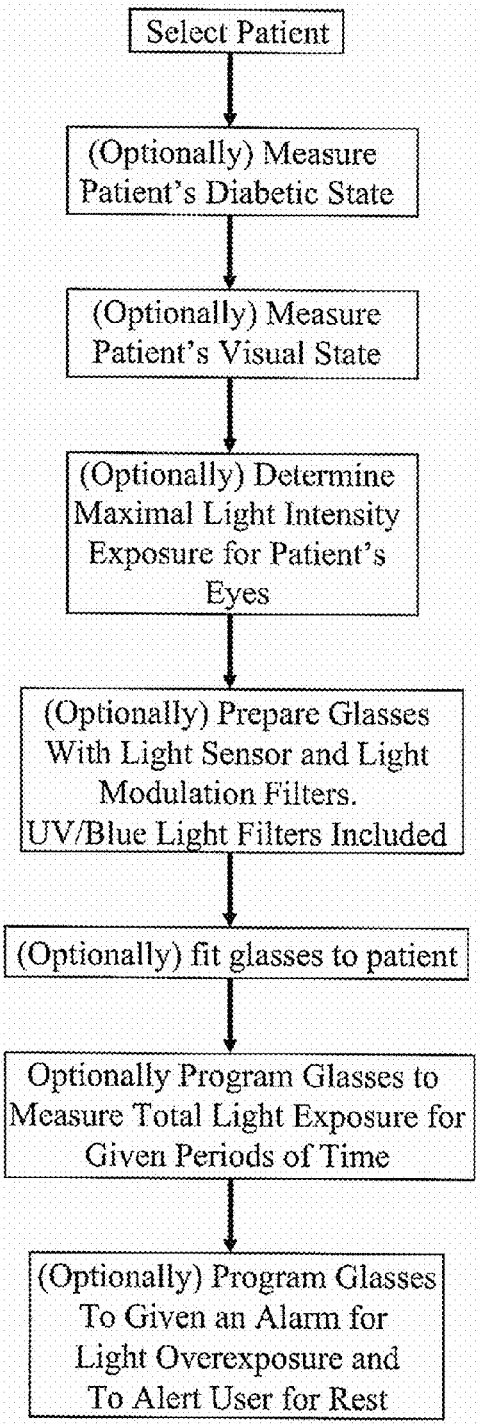
FIG. 10 shows a flowchart for a method of preparation of glasses for a user according to the present invention.

Attention is now turned to FIG. 10, which is a flowchart showing a possible procedure in preparing a retinal light control system for a patient. It is noted that in many cases, embodiments previously described could be sold "over the counter" with predetermined light intensity cutoffs. Additionally, it is understood that potential users of embodiments of the present invention could include diabetics, astronauts, pilots, as well as members of the general population. A diabetic or someone concerned about eye health, could buy a set of glasses as per one of the embodiments of the present invention, said glasses not allowing more than a predetermined amount of light to pass through lenses to user's eyes. Light intensity ranges could be for example between 50 and 150 lux, or some other appropriate value. In some cases, it is assumed that user will be fitted for a retinal light control system as described in the various embodiments of the present invention.

As shown in FIG. 10, a patient is selected. Patients are generally diabetic or have symptoms of macular degeneration or other retina-related degenerative ailments, or belong to a risk group for developing eye damage. As noted above, the "patient" need not exhibit any particular symptom and may, for example, be a healthy pilot. Optionally, patient's diabetic condition may be checked. Specifically, glucose concentrations may be monitored to determine the extent of hyperglycemic behavior. Optionally, the condition of the patient's retina may be checked prior to fitting of glasses. Checking of retina may be performed according to any relevant methodology (e.g., funduscopy). Subjects with normal retina or with retina already damaged by diabetes or other ailment may be fitted for glasses according to some embodiments of the present invention. After the retina and eye have been checked, an attending physician or other health care provider can determine the maximum amount of light that can be allowed to pass through glasses prepared according to the present invention. This maximum value is determined to allow for optimal light usage without light-associated damage of retina. Maximum values can be established for the absence and presence of rest periods as previously described. After maximum light intensity values have been determined, glasses or other light filtration elements (such as contact lenses or windows) are prepared and relevant light intensity control data are programmed into a portion of the glasses (in those embodiments that involve electronic light filter control). In the case of glasses, according to some embodiments, a light intensity sensor and controller element may be included; the former informs the latter of impending light intensity, so that the controller element may appropriately filter incoming light down to the previously-mentioned predetermined light intensity value. Filtering may involve color dyes, liquid crystal filters or other electronic or mechanical means for modulating light of wavelengths 530-700 nanometer that are allowed to pass through glasses. Light of wavelengths 300-530 nanometers is filtered out (e.g., at least 90% of incident light) optionally before, but possibly after filters and/or dyes associated with lenses modulate the intensity remaining light. The glasses as described may optionally be fit to patient so as to be comfortable. The glasses may optionally also be prescription glasses. The glasses may optionally be programmed so as to alert user to conditions in which too much light is passing through lenses of said glasses. Additionally and optionally, glasses may be programmed to alert user that he/she has been exposed to light for a period of time that is considered to be maximal for his/her condition. At that time, the controller element can either further reduce light intensity passing through lens-associated filter elements or it can allow for user to seek rest from light exposure.

Example Reactive System

Figure 11A:
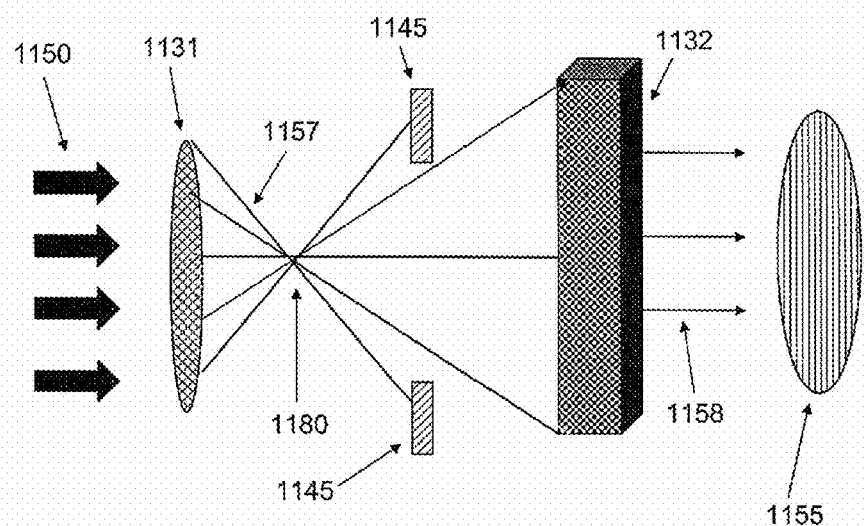
FIGS. 11A and 11B shows a schematic view of an exemplary embodiment of the present invention as it is practiced both during daytime and at night or indoors.
Figure 11B:
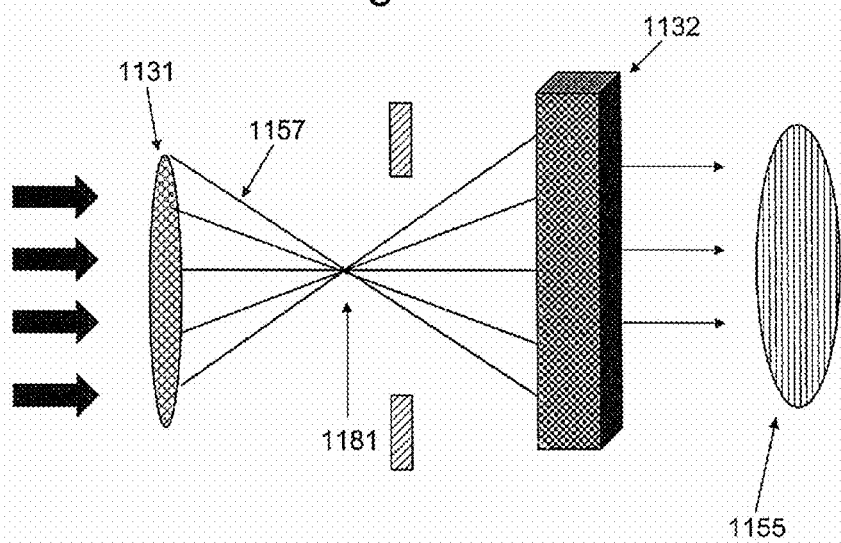

Attention is now turned to FIG. 11A which shows an embodiment of the present invention as used during daylight hours, in which refractive index changes are used to control the amount of light reaching an eye, as opposed to optical density and/or polarization modification as generally mentioned above. A first lens (1131) made of a photorefractive material, namely one that changes its refractive index in response to incident light (1150) is placed before an aperture that is defined by edges (1145) and whose size is selected for allowance of passage of light (1157) after the first lens (1131). After the aperture is a photorefractive developing lens (1132) that focuses light (1157) into parallel beams (1158) that then travels to a user's eye (1155). The advantage of the embodiment of the invention as described in FIG. 11A includes a daytime focal point (1180) between first lens (1131) and aperture. The aperture is positioned and is of such a diameter so as to allow light passing through the photo-reactive first lens (1131) to reach second lens (1132) for focusing. In FIG. 11B, night/indoor conditions are shown. Night/indoor conditions necessitate a nighttime focal point (1181) that allows for more light (1157) to pass through aperture and second lens (1132) to user's eye (1155). For example, daytime focal point (1180) might be 3 millimeters from first lens (1131), while nighttime focal point (1181) might be 7 millimeters from first lens (1131). Nighttime focal point (1181) will be longer than daytime focal point (1180). The aperture as defined by edges (1145) will always be positions after the location of nighttime focal point (1181) but its specific position must be carefully selected so as to allow for optimal light delivery to user's eye (1155). Non-limiting examples of photorefractive crystals for use in lens (1131, 1132) construction include $BaTiO_3$ (transmittance 400-900 nanometers), $KNbBO_3$ (transmittance 400-900 nanometers), and $LiNbO_3$ (transmittance 400-700 nanometers).

It is expected that during the life of a patent maturing from this application many relevant sunglasses and light modulation technologies and similar devices will be developed and the scope of the term is intended to include all such new technologies a priori.

EXAMPLES

An animal study was undertaken to determine the efficacy of controlling light intensity reaching retina associated with a diabetic condition.

Aim of the Study:

The aim of this study was to examine the effect of light on the development of retinopathy and cataract in diabetic rats.

Materials and Methods:

Diabetes was induced in rats by intra-peritoneal injection of streptozotocin (STZ). Blood glucose levels were measured 3 days after the injection of STZ; rats with blood glucose levels >300 mg % were identified as diabetic. Study was started 7 days after the induction of diabetes.

Study Groups:

12 rats (6 control, 6 diabetic): 12 (h)—normal light/12 (h)—dark.

12 rats (6 control, 6 diabetic): 12 (h) filtered light/12 (h)—dark.

8 rats (4 control, 4 diabetic): 24 (h) dark.

4 rats (2 control, 2 diabetic): 24 (h)—filtered light.

Filtered light characteristics: Light intensity was reduced from 600 LUXS to 150 LUXS and light wavelength below 530 nm was blocked.

11 weeks later, both ERG recordings and GFAP expression in muller cells were examined in order to assess retinal function. The development of cataract was monitored as another sign of DM.

Results

| | Control | | | Diabetics | | |
|---|---|---|---|---|---|---|
| Dark | Filtered light 12/12 | Normal light 12/12 | dark | Filtered light 12/12 | Normal light 12/12 | |
| 650 | 610 | 350 | 490 | 440 | 220 | Mean Vmax |
| 0 | 0 | 0 | 0 | 1/4 | 4/6 | cataract |
| 0 | 0 | + | 0 | + | ++ | GFAP expression |

Retinas of rats from the group of filtered light for 24 (h)/day were completely destroyed. ERG recordings were 0, and GFAP was expressed in the whole retina.

Conclusions from Study and Reflected in some Embodiments of the Invention

In all groups, diabetic rats were affected more than controls.

The higher the intensity of light, the worse the damage to the retina, both in diabetic and control rats.

The difference between normal and filtered light was more pronounced than that seen between filtered light and dark.

All the findings of the ERG were supported by immunocytochemistry (GFAP expression) data.

Retinas of rats staying in constant filtered light (24 h/day) were completely destroyed, which may indicate that retina needs a minimal period of dark in order to recover.

Cataract developed only in lens of diabetic rats which were exposed to light.

Filtration of the light reduced the risk of cataract development.

Reduction of both light intensity and blockage of light wavelengths <530 nm contribute to the reduction of the retinal damage, and the development of cataract in diabetic animals.

Figure 12A:
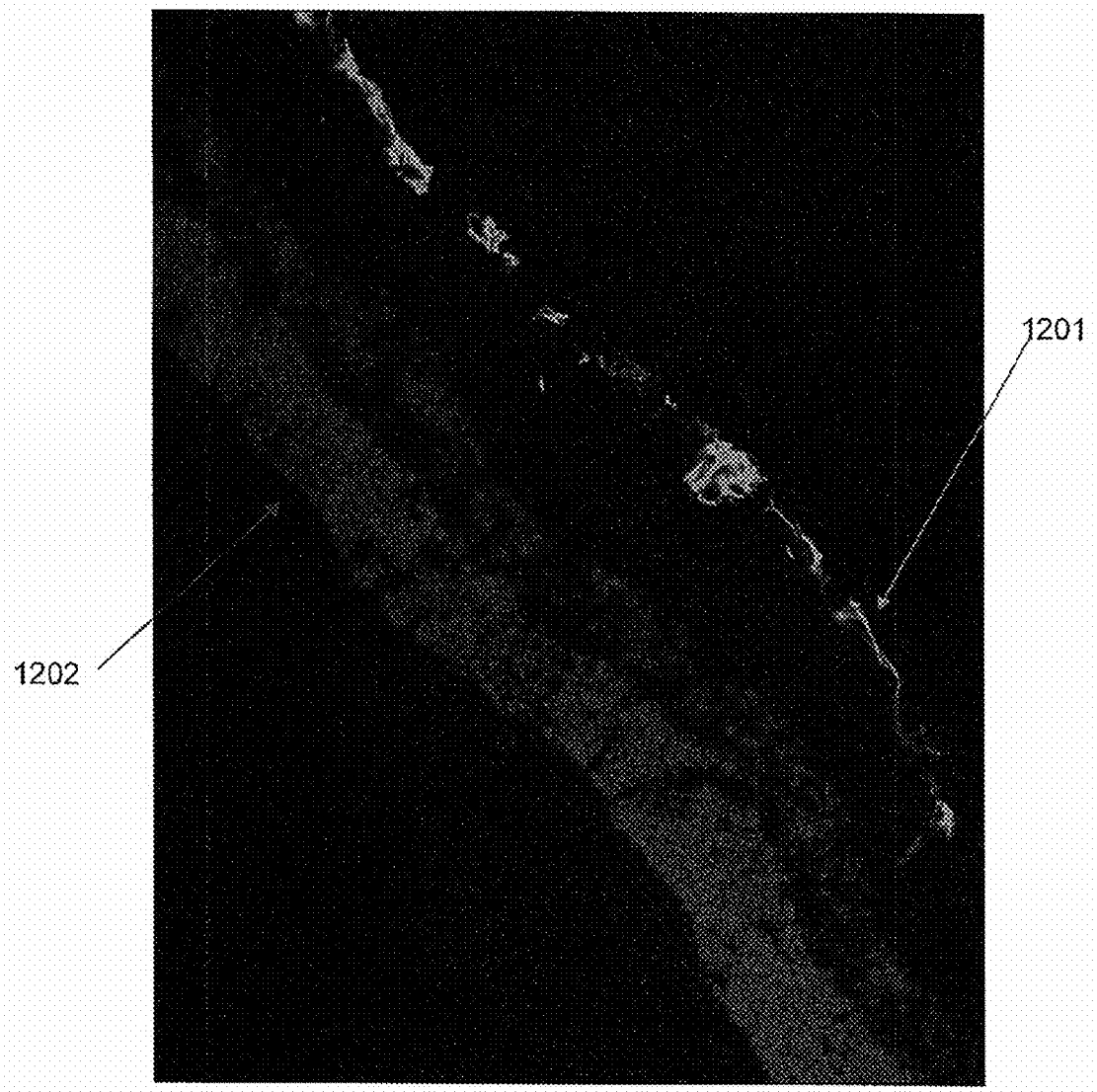
FIGS. 12A and 12B show histological results of an experiment in rats comparing damage to eye with and without filtering in accordance with some embodiments of the invention.
Figure 12B:
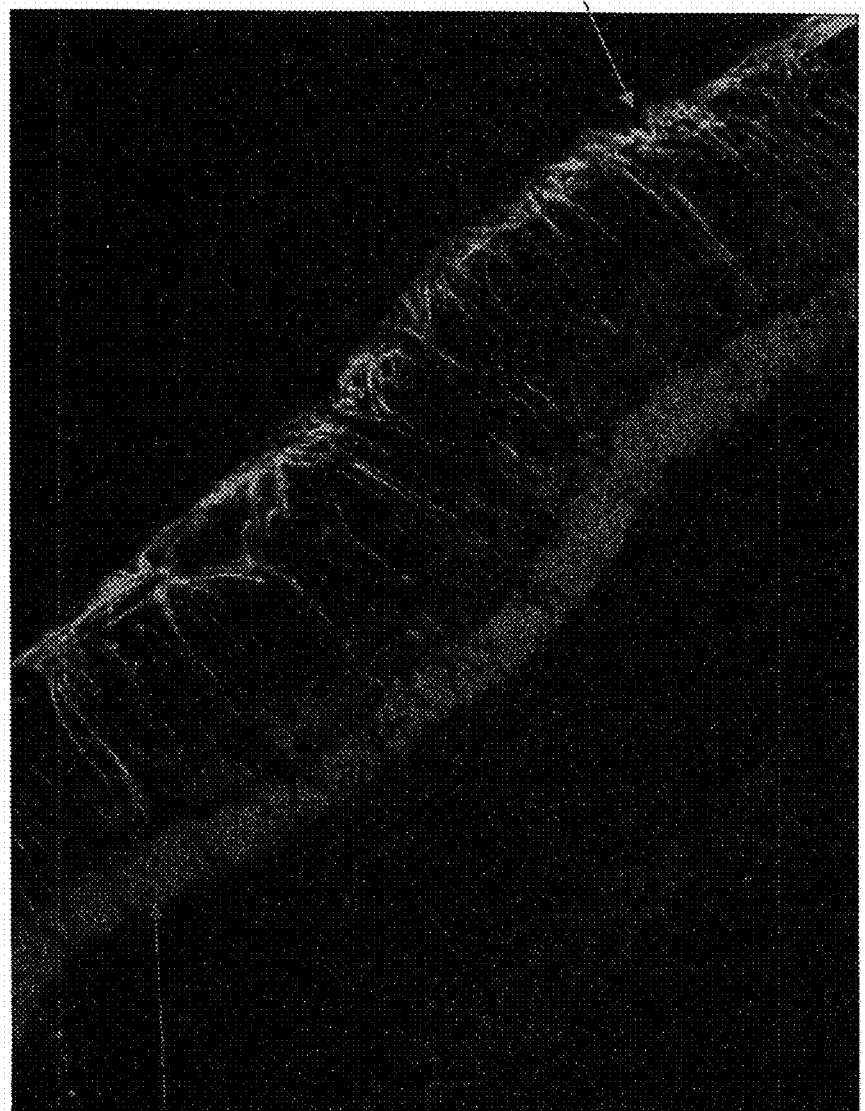

Attention is now directed to FIG. 12A, which shows results for exposure of retina of rats used in the study described above. Protein GFAP (Glial Fibrillary Acid Protein, 1201) in Muler cells is shown in dark color after light exposure without any light filtering. This dark color as compared to GFAP coloring in cells exposed to filtered light (FIG. 12B, 1201) is evidence for strong light overexposure for the retina. The number of hotoreceptors associated with inner and outer cells (1202, FIG. 12 A) is significantly lower for the retina exposed to unfiltered light as compared to those associated with cells exposed to filtered light (1202, FIG. 12 B).

General

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is noted that "patient", "user", and "diabetic" are used interchangeably and generally refer to one who would make use of an embodiment of the present invention.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub ranges as well as individual numerical values within that range. For example, description of a range such as from 1 to 6 should be considered to have specifically disclosed sub ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing and/or reversing the progression of a condition, substantially ameliorating clinical and/or aesthetical symptoms of a condition and/or substantially preventing and/or delaying the appearance of clinical and/or aesthetical symptoms of a condition.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, embodiments of the present invention may allow for estimating light on retina of a user, by measuring light coming in from side and scattering in eye. A scattering coefficient for an individual user may be pre-programmed in a controller element. Alternatively, the size of the pupil may be measured an used in calculating amount of light intensity actually reaching the retina in the back of the eye.

Additionally, light intensity meters may be located on the outside of glasses and facing incoming light radiation. Additionally and/or alternatively, light intensity meters may be placed inside glasses to monitor level of lights passing through filters associated with embodiments of the present invention. Additionally, internal light intensity meters can verify that embodiments of present invention work.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for light management including: 1. at least one filter configured to modify light reaching an eye to prevent continued retinal degradation in compromised patients, and 2. an eye damage monitor;
    wherein said at least one filter comprises:
        a filtering property operable to block light with wavelength shorter than a wavelength in the range of 451-650 nm, wherein light with wavelength shorter than a wavelength in said range includes blue light; and
        a variable filtering property operative to actively maintain light with wavelengths longer than a wavelength in said range within a preset range of light intensities low enough to prevent said continued retinal degradation in said compromised patients; and
    wherein said eye damage monitor comprises:
        (a) a light sensor;

(b) circuitry which accumulates light readings from said sensor and generates an indication of light-caused damage; and (c) an output device which reacts to said indication.

2. A system according to claim 1, wherein the preset range maintain light intensities reaching an eye to be below a first preset value and above a second preset value, which second value is functionally usable and above 30 Lux, over a range of illumination conditions ranging from 100 Lux to 5000 Lux.

3. A system according to claim 2, wherein the first preset value is selected from one of 50 Lux, 100 Lux, 150 Lux, 350 Lux, 500 Lux and 800 Lux.

4. A system according to claim 1, comprising at least one electrically controlled light attenuating element, and wherein said circuitry controls said light attenuating element in response to a light intensity signal from said sensor.

5. A system according to claim 4, wherein said circuitry varies said reaching intensities according to an estimating of accumulated damage.

6. A system according to claim 1, wherein said circuitry includes an alarm.

7. A system according to claim 1, wherein said system comprises an eyewear, and said sensor is physically separate from said eyewear.

8. A system according to claim 1, wherein said circuitry is programmable with respect to at least one of said preset values.

9. A system according to claim 1, comprising at least one non-linear dye which changes optical density in response to light intensity impinging thereon.

10. A system according to claim 1, wherein said wavelength range is between 500-650 nm.

11. A system according to claim 10, wherein said blocked light is blocked to an intensity below said preset range of light intensities.

12. A monitor according to claim 1, wherein said output device comprises an alarm device.

13. A monitor according to claim 1, wherein said output device comprises at least one optical light filter adapted to be mounted adjacent an eye.

14. A monitor according to claim 1, wherein said circuitry accumulates different readings at different wavelengths.

15. Eyewear according to claim 1, wherein said eyewear further includes a filtering property operable to block light of all wavelengths a variable amount.

16. A system according to claim 1, wherein said system comprises eyewear.

17. A system according to claim 1, wherein said modifying comprises controlling and/or maintaining.

18. A system according to claim 1, wherein said block comprises selecting one or more from the group consisting of:
block a time varying amount of light,
block a wavelength dependent percentage of light.

19. A system according to claim 1, wherein said maintaining light within a preset range of light intensities comprises selecting one or more from the group consisting of:
maintaining a time varying amount of light,
maintaining a wavelength dependent amount of light.

20. A method of preventing or reducing damage to an eye, comprising:
determining a damage level for a particular patient;
blocking light below a wavelength in the range of 450-650 nm; and
maintaining a light intensity reaching an eye at a range above said wavelength range at an intensity below said damage level for both indoor and outdoor activities, using an active optical element associated with the eye.

21. A method according to claim 20, comprising trading off damage levels and functionally useful levels in said maintaining.

22. A method according to claim 20, wherein maintaining comprises maintaining for at least 50% of the time.

23. A method according to claim 20, comprising:
tracking an intensity of light reaching an eye over prolonged periods of time.

24. A method according to claim 23, wherein said tracking comprises tracking at a plurality of wavelengths.

25. A method according to claim 20 for preventing retinal damage in a diabetic patient and to prevent the development of cataract, including the following steps:
selecting a patient; and,
providing said patient with light filters, said light filters having a maximum light intensity cutoff for light that passes through lenses of said light filters.

26. The method according to claim 25 wherein said maximum light intensity cutoff is 150 Lux.

27. The method according to claim 25, further providing filters for removal of at least 90% of light with wavelength between 300-530 nanometers.

28. The method according to claim 25, wherein said light filters are made of photorefractive materials.

* * * * *